N. S. BEALE.
NON-SKID DEVICE.
APPLICATION FILED DEC. 12, 1917.
1,274,232.
Patented July 30, 1918.
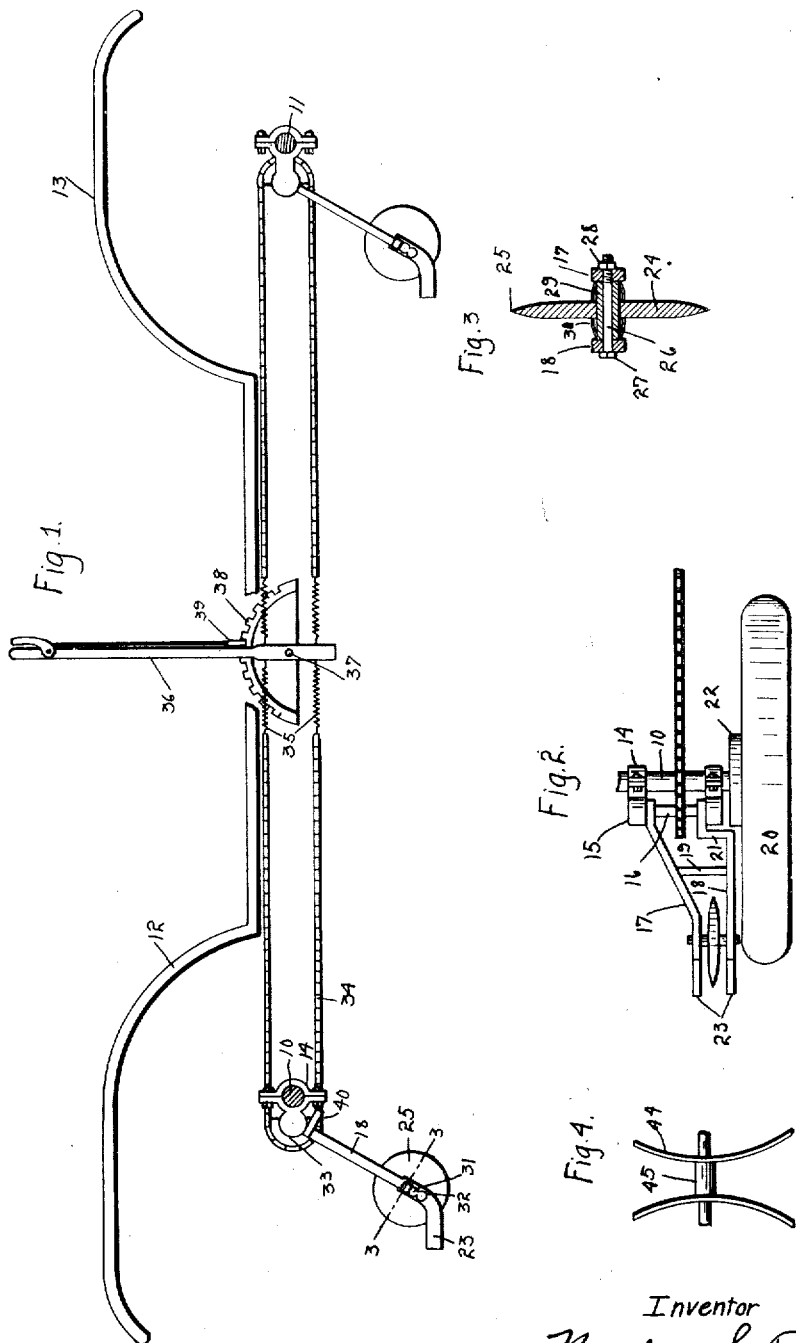
Witness
E. H. Buchanan
Inventor
Newton S. Beale
By Orwig & Bair Attys.

UNITED STATES PATENT OFFICE.

NEWTON S. BEALE, OF TAMA, IOWA.

NON-SKID DEVICE.

1,274,232.   Specification of Letters Patent.   Patented July 30, 1918.

Application filed December 12, 1917. Serial No. 206,841.

*To all whom it may concern:*

Be it known that I, NEWTON S. BEALE, a citizen of the United States, and resident of Tama, in the county of Tama and State of Iowa, have invented a certain new and useful Non-Skid Device, of which the following is a specification.

The object of my invention is to provide a non-skid device of simple, durable and inexpensive construction.

More particularly it is my object to provide a non-skid device adapted to be mounted on the fixed frame of an automobile, and having a lever adapted to have any suitable location, whereby the non-skid device may be manipulated from the seat or otherwise.

More particularly it is my object to provide a non-skid device comprising a member adapted to travel over the ground and pivotally supported on the frame of the machine, with means for dropping said member to the ground and for forcing it into the ground when desired.

Still a further object is to provide such a device having a rotary member adapted to travel on the ground and having a shoe or the like so arranged that when the rotary member is pressed in the shoe a certain distance, the shoe will engage the ground.

Still a further object is to provide a means for mounting the rotary member for adjusting its position on its support, whereby the device may be adjusted for use with automobiles of different sizes.

Still a further object is to provide such a device having a member adapted to travel on the ground supported on a pivoted arm or the like, the parts being so arranged that the arm cannot pass a certain predetermined point in its rotary swinging movement.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a portion of an automobile frame including front and rear axles equipped with a non-skid device embodying my invention.

Fig. 2 shows a top or plan view of part of the rear axle with the non-skid device installed thereon.

Fig. 3 shows a sectional view taken on the line 3—3 of Fig. 1; and

Fig. 4 shows a rear elevation of a modified form of the rotary member which travels on the ground.

In the illustration of my invention shown in the accompanying drawings, I have used the reference numeral 10 to indicate generally the rear axle of an automobile. The automobile has also the front axle 11, and I have shown the front and rear fenders 12 and 13.

My improved non-skid device includes for each unit of the device a bracket or brackets 14 clamped on the rear axle housing and extending rearwardly and formed with bearings 15 rearwardly of the axle.

Rotatably mounted on the bearings 15 is a short transverse axle 16. Fixed to the axle 16 is a frame comprising members 17 and 18 which are inclined somewhat toward each other from the axle 16 toward their free ends. The frame members 17 and 18 are fixed on the axle 16 and are connected between their ends by a brace 19. The frame member 18, which is designed to be adjacent to the rear wheel 20 is preferably formed with a shoulder or the like 21 for permitting the frame to clear the brake shoe casing 22 for thereby permitting the frame to be located as nearly as possible to the rear wheel and to be properly located beneath the fender 12.

At their free end the frame members 17 and 18 are provided with shoes 23 which stand in substantially horizontal position when the device is in its position shown in Fig. 1.

Rotatably mounted between the frame members 17 and 18 is a member adapted to travel on the ground which may be in the form of a disk or wheel 24, shown in Figs. 1 and 3, preferably having a substantially sharp head 25.

Extending through the arms 17 and 18 is a bolt 26 having at one end a head 27 and on the other end a nut 28.

Mounted on the bolt 26 between the arms 17 and 18 is a spacing sleeve 29 on which rotates the hub 20 of the wheel 24.

The bolt 26 is extended through elongated slots 31. The arm 18 has in its outer surface a series of depressions 32 to receive the head 27, so that the bolt 26 may be locked in any of its adjusted positions.

It will be seen that by adjusting the bolt 26 in the slots in the arms 17 and 18 the device may be adapted for use with cars having wheels of different diameters.

Connected with each shaft 16 is a gearing device 33 of any suitable construction on which is mounted a chain 34.

Secured to the ends of the chain 34 are springs 35 which are connected with a suitable upright lever 36 above and below respectively, the pivot point 37 at which said lever is mounted on the frame of the machine.

Adjacent to the lever is a toothed sector 38 adapted to coact with an ordinary pawl 39 on the lever.

Mounted on the front axle 11 is a similar non-skid device similarly constructed and arranged with the exception that it may be spaced inwardly from the wheel somewhat to permit the wheel to turn for steering.

On one of the arms 17 or 18 is a stop lug 40 designed to engage some part of the clamp device 14 when the arms 18 drop to substantially vertical position, for a purpose that will be hereinafter mentioned.

In the practical use of my improved non-skid device, as many of the units may be used on the car as may be desired.

The parts are installed on the car as hereinbefore described, and as shown in Fig. 1, and the lever 36 is manipulated for pulling the chain 34 for raising the arms 17 and 18 to substantially horizontal position.

The rear non-skid device will be located below the rear fender 12. The parts are carried in their raised position during ordinary travel. When, however, the driver expects to drive over a slippery road or over a surface where the car is likely to skid, the lever 36 is manipulated for dropping the wheel 24 to the ground.

It will be seen that the lever can be used for forcing the wheel 24 against the ground as hard as may be desired and that when the wheel is so employed, it will naturally resist any tendency of the bar to slide sidewise.

The parts are so arranged that ordinarily the lower surfaces of the shoes 23, when the parts are in position for use, stand slightly above the lowermost edge of the wheel 24. In most kinds of ground, the user of the device may employ the lever 36 for forcing the edge of the wheel 24 into the ground until the shoes 23 firmly press against the ground, whereupon the driver of the car may utilize both the wheel 24 and the shoes 23 to prevent skidding.

It will be seen that if a car should accidentally start backing down a hill, the driver would simply operate the lever 36 for thereby dropping the wheel 24 and forcing it into the ground, whereupon the shoes 23 would engage the ground and would prevent any further backing of the car. On account of the use of the stops 40 the arms 18 cannot pass forwardly beyond perpendicular position.

Under ordinary conditions where there is likely to be skidding, the wheels 24 of equivalent members, are maintained in their lowered position, but it will be seen that under some circumstances they might be dropped even after the car had begun skidding.

Numerous modifications of my device might be made.

In Fig. 4 I have shown a modified form of a wheel comprising two spaced disks 44 each being concave and having their convex surfaces adjacent to each other connected by a hub 45.

Other changes in the details of the construction and arrangement of the parts of my improved non-skid device may be made without departing from the essential purpose and features of my invention, and it is my intention to cover by my claims, any modified forms of structure or use of mechanical equivalents, which may be reasonably included within the scope of my claims.

I claim as my invention:

1. In a device of the class described, a frame designed to be pivotally mounted on a motor vehicle, a rotary member adjustably mounted near one end of said frame for permitting the rotary member to be secured on said frame at different distances from the motor vehicle frame, and means for swinging said frame on its pivot and for securing it in its raised position.

2. A non-skid device comprising a supporting device, a frame pivotally supported thereon, having spaced opposite arms converging toward their free ends, a rotary member mounted between said arms near their free ends, means for raising and lowering said frame on its pivot, said means including a gearing device on said frame, a chain connected with said gearing device, springs connected with the ends of said chain, a lever pivotally supported, said springs being secured to said lever on opposite sides of its pivotal point.

3. A non-skid device comprising a supporting device, a frame pivotally supported thereon, having spaced opposite arms converging toward their free ends, a rotary member mounted between said arms near their free ends, and capable of adjustment longitudinally of said arms, means for raising and lowering said frame on its pivot, said means including a gearing device on said frame, a chain connected with said gearing device, springs connected with the ends of said chain, a lever pivotally supported, said springs being secured to said lever on opposite sides of its pivotal point, said arms having shoes at their free ends adapted to travel on the ground.

4. In a non-skid device, a support, a frame pivotally mounted thereon, having arms converging toward their free ends, a wheel, means for adjustably mounting said wheel between said arms near their free ends, said arms having shoes at their free ends.

5. In a non-skid device, a support, a frame pivotally mounted thereon, having arms converging toward their free ends, a wheel, means for mounting said wheel between said arms near their free ends, a gearing device on said frame, a chain thereon, a lever pivoted between its ends, and springs secured to the ends of said chain and to said lever on opposite sides of its pivot point.

Des Moines, Iowa, November 30, 1917.

NEWTON S. BEALE.